United States Patent

Harnsberger et al.

[15] 3,654,992
[45] Apr. 11, 1972

[54] FRACTURING METHOD
[72] Inventors: Bobby G. Harnsberger; Joy T. Payton, both of Houston, Tex.
[73] Assignee: Texaco Inc., New York, N.Y.
[22] Filed: June 19, 1970
[21] Appl. No.: 47,880

[52] U.S. Cl. ............................................166/281, 166/283
[51] Int. Cl. .....................................................E21b 33/138
[58] Field of Search ...................................166/276, 281, 283

[56] References Cited

UNITED STATES PATENTS

| 3,208,522 | 9/1965 | Roebuck et al. | 166/283 |
| 3,389,751 | 6/1968 | Harnsberger | 166/276 |
| 2,933,135 | 4/1960 | Johnson | 166/283 X |
| 3,046,222 | 7/1962 | Phansalkar et al. | 166/283 |

*Primary Examiner*—David H. Brown
*Attorney*—Thomas H. Whaley, Carl G. Reis and James F. Young

[57] ABSTRACT

An improved method of fracturing an underground fluid bearing formation penetrated by a well bore for the production of fluids therefrom by injecting a composition capable of forming a fluid permeable barrier in said formation at a pressure sufficient to form fissures therein extending from said well bore, and thereafter maintaining pressure on the composition for a predetermined period to permit the composition to set and form a fluid permeable barrier in the formed fissures.

3 Claims, No Drawings

FRACTURING METHOD

The present invention relates to an improved method for the recovery of petroleum from an underground petroleum containing formation.

It is known to use various fluids in fracturing operations for the initiation and/or enlargement of fissures in underground fluid containing formations such as a hydrocarbon bearing formation. In this known procedure, a fluid called the fracturing fluid is pumped into a well bore and forced out into the formation under a pressure sufficient to open up fissures in the formation and/or to enlarge any natural fissures therein. It is desirable to add to the fracturing fluid a propping agent or mixture of such agents to maintain the created and/or enlarged fissures in the open position to enhance the flow of formation fluids therethrough into the well bore for subsequent recovery therefrom by conventional recovery techniques. Among known propping agents are solid particles such as sand, walnut shells, glass beads, metal pellets, plastics and the like.

Suitable fracturing fluids include fresh water, brines, gelled water (fresh or brine), gelled acids, and liquid hydrocarbons such as gasoline, kerosene, diesel oil, gas oil and the like, that usually have incorporated therein a bodying or gelling agent such as sodium palmitate.

Among the disadvantages associated with the known hydraulic fracturing methods using propping agents is the tendency of the formation after being fractured to reseal itself at the induced or enlarged fissures with the result that the propping agents are crushed or forced into the formation and their beneficial effects destroyed.

Another disadvantage is that the propping agents are removed from their locations in the fissures by the flow of formation fluids during subsequent petroleum production operations and their propping function is materially decreased or lost with a resultant loss of production of petroleum fluids.

It has now been found that the above disadvantages can be overcome or materially lessened by the novel fracturing method of the present invention.

An object of the present invention is to provide an improved formation fracturing method.

It is known from commonly assigned U.S. Pat. No. 3,389,751 to treat unconsolidated sandy formations with a treating composition of sand, cement and water in a petroleum fraction carrier medium thickened with a gelling agent which sets and forms a permeable cement barrier. The formed cement barrier prevents the movement of unconsolidated said particles with the flow of formation fluids during producing operations. The disclosure of this patent is herein incorporated by reference.

How these and other objects of the invention are accomplished will become apparent with reference to the accompanying disclosure. In at least one embodiment of the practice of the invention, at least one of the foregoing objects will be achieved.

In accordance with the present invention, the improved method comprises fracturing an underground fluid bearing formation penetrated by a well bore for the production of fluids therefrom by injecting a composition of sand, cement and water in a gelled petroleum fraction, capable of forming a fluid permeable barrier in said formation at a pressure sufficient to form fissures therein extending from said well bore, and thereafter maintaining pressure on the composition for a predetermined period to permit the composition to set and form a fluid permeable barrier in the formed fissures.

The invention in a further aspect also comprises carrying out the fracturing operation with a fracturing fluid such as water, oil or the like, which optionally may contain a propping agent such as sand, glass beads or the like, including mixtures thereof, and after the formation has been fractured and optionally propped open, then injecting the composition into same to keep the fissures open and/or lock in the propping agent by the formed fluid permeable barrier and permitting the cement component to set up and harden in the formed fissures and form a fluid permeable barrier therein.

One unexpected advantage accruing from this aspect of the invention is that the placed propping agents are prevented from being washed out of the formed formation fissures by the formed permeable cement barrier during production of formation fluids with a resultant decrease and/or interruption of production of the desirable formation fluids.

The method of the present invention is believed to be particularly adaptable to fracturing operations wherein the underground formations are composed of soft calcareous matter such as the Annona Chalk formations in Louisiana. The method of the present invention will prevent and/or retard the closing up or healing of the fissures in such fractured chalk formations.

The composition useful in the method of the present invention should meet certain requirements.

The sand component of the composition should be of a U.S. Sieve Size between about 12 and 80 mesh to permit a good cement to be formed therewith and also to provide effective propping and/or to prevent sealing of the fissures. A mesh size between 20 and 40 mesh is preferred for excellent interstitial permeability without sacrificing desirable propping effects.

The sand component of the treating composition should be employed in an amount of 4 to 8 parts by weight per part by weight of the cement component. It has been found that a frac sand, i.e. one customarily used in fracturing, can also be used in the composition provided the mesh size is about 20 to 40 mesh.

The use of a graded sand with the large grains being not more than about twice the diameter of the smaller grains, i.e. 12 mesh to 20 mesh, 20 to 40 mesh, is preferred since premature bridging of the sand grains is likely to be avoided.

Sand particles coarser than 12 mesh and finer than 80 mesh are unsuitable for use in the treating composition of the invention. The coarser particles are unsatisfactory because the strength of the formed permeable barrier is quite low. Very fine sand particles also are unsuitable because the permeability of the permeable cement barrier formed therewith is quite low.

The cement component of the composition of the present invention should be present in the dry mixture in a ratio of about 1 part of cement to from 4 to about 8 parts by weight of sand on a weight basis. The cement component of the composition of the present invention may be any of the cements normally used in oil well cementing operations as well as plaster of Paris cement, sodium silicate cement, a silicophosphate cement, an acid phosphate cement or a pozzolan cement, a sorel cement or a litharge cement. It is preferred that the cement component be a light weight Portland cement having a density of about 75 lbs. per cubic foot and a chemical analysis approximately as follows: silicon dioxide 38.3 percent, aluminum oxide 13.0 percent, ferric oxide 5.2 percent, calcium oxide 35.7 percent, magnesium oxide 1.6 percent and sulfur trioxide 2.4 percent, with a loss on ignition of approximately 3.3 percent. This particular light weight Portland cement has been found to be most suitable in the composition of the present invention since permeable cements made from this cement are most stable against attack by the formation brines containing sodium chloride or sodium sulfate. Some other oil well cements are not as resistant to attack by formation brines or sulfate solutions and therefore are not as practical for use in the cement composition of the present invention. These other cements appear to lose some of their compressive strength and become eroded from contact with sodium chloride and sodium sulfate solutions. In contrast, the cements of the composition of the present invention are very resistant to erosion by sodium chloride or sodium sulfate solutions and do not lose their compressive strength even after prolonged exposure thereto.

The water component of the composition will vary with the type of cement and the sand mesh range. Satisfactory results are obtained with from about 0.5 to about 0.8 part of water per part by weight of cement, when 20 to 40 mesh sand is used. Excess water may result in the separation of cement laden droplets of water from the sand whereas insufficient water may result in the separation of cement solids from the sand. In either case the formation may be damaged.

The hydrocarbon oil component of the composition should be employed in an amount of from about 0.5 part to about 1.5 parts by weight per part by weight of cement. It is preferred that the oil component be employed in an amount of about 0.7 to about 1.5 parts by weight per part by weight of cement. Use of the oil component in this amount provides sufficient oil to disperse or suspend the sand-cement-water composition in the hydrocarbon oil while avoiding a too fluid or too viscous suspension or dispersion.

Suitable hydrocarbon oils include the kerosene, diesel oil and heavier residual fractions of a petroleum crude oil or a refined oil and mixture of such oils. A satisfactory petroleum fraction comprises a 100–120 grade aircraft engine oil, i.e. a heavily refined paraffin base residual oil or a blend of such refined residual oil with a heavily refined paraffin base distillate oil.

Typical properties for the heavily refined residual fraction include an API gravity of 26°–29°, a viscosity at 210° F. of 100–125 cp. and a Flash Point, COC, of about 520° F. or more.

A necessary component of the petroleum oil fraction of the composition of the present invention is an oil gelling or thickening agent, i.e. a fatty acid soap such as sodium oleate, aluminum stearate, a naphthenic acid soap such as sodium naphthenate or a polymeric thickening agent such as a polybutylene of relatively high molecular weight.

The gelling agent is used in an amount of from about 3 to about 7 percent by weight based on the weight of the hydrocarbon oil. A preferred gelling agent is a polybutylene known as and by the trade name Dowell J–105, which is used in an amount of about 5 percent by volume of the carrier oil. The polybutylene has an apparent molecular weight of about 400,000, and is in a petroleum fraction. The product has a Brookfield viscosity at 75° of about 7,500 cp., a flash point of about 145° F. and a specific gravity of 0.8. Use of more than about 10 percent of gelling agent results in decreased permeability to the resulting cement after hardening.

The density of the composition of the present invention may vary from about 12 to about 18 pounds per gallon with a density of 15 pounds being preferred. The solids content of the composition is generally about 10 pounds per gallon, although a range of from 6 to 12 pounds is satisfactory.

The composition of the present invention requires each of the components, sand, cement, water and gelled oil, to form the permeable cement barrier. An admixture of sand, cement and water alone will result in a non-porous cement. Omission of the sand will result in an impervious glue. The water component is required to initiate hydration and hardening of the cement. Omission of the gelling agent would result in reduced permeability and most likely would result in separation of the oil and solids during the pumping stage.

The carrier medium containing the suspended solids is pumped down the well bore and into the formation at rates which may vary with well conditions. Generally a rate of from about 5 to 40 barrels of the suspended solids in the carrier medium per minute is suitable to fracture an interval. Such rates give the satisfactory results and the resulting permeable cement barrier formed in the formation has a sufficiently high compressive strength and sufficient permeability to permit the flow of formation fluids therethrough while stabilizing the fracture.

In the practice of this invention for the fracturing of underground formations to increase their fluid productivity and/or permeability, a fracturing fluid is placed in a well penetrating the formation to be fractured, optionally through the tubing, adjacent and in contact with the face of the formation to be fractured. If desired or required, packing is employed to isolate and confine the fracturing fluid to a portion of the well exposing the formation to be fractured. Pressure is then applied to the fracturing fluid either directly or indirectly, as for example by pumping another fluid into the well on top of the fracturing fluid, so as to build up the hydrostatic pressure at the formation exposed to the fracturing fluid to a value great enough to cause the formation to be fractured.

The pressure required to fracture the formation varies from place to place depending upon the depth and/or the nature of the formation being fractured. Suitable fracturing pressures are in the range 1,000–15,000 p.s.i. and may be higher. When the formation fracturing pressure has been reached, the formation is fractured and the formed fissures provide additional areas for drainage of formation fluids.

Following is a description by way of example of a method and composition of the present invention.

EXAMPLE I

There is prepared a fracturing fluid consisting essentially of an admixture of 5 parts by weight of a frac sand having a 20 to 40 mesh size, 1 part by weight of a cement known by the trade name Trinity Lite-Wate Cement, and 0.7 parts by weight of water, and the admixture is suspended in 1.3 to 1.9 parts by weight of a heavily refined residual fraction having the following properties: API Gravity 26°–29°, a viscosity at 210° F. of 100–125 centipoises, and a Flash Point, COC, of about 520° F. The petroleum oil fraction contained 5 percent by weight of a gelling agent known by the trade name Dowell J–105, a polybutylene having a molecular weight of approximately 400,000, in a kerosene type solvent.

The resulting suspension of sand, cement and water in the gelled petroleum oil fraction is pumped down the well bore under sufficient pressure to create fractures in the formation. Pumping is continued to enlarge the fissures and force the treating composition thereinto. After a sufficient quantity of the composition is placed in the formation fractures, the well is shut in to prevent any substantial quantity of the composition from being forced back into the bore hole. The water component causes the cement particles to set and form a fluid permeable barrier in the fissures. Formation fluids can be produced therethrough.

EXAMPLE II

In a "tailing in" operation, the formation is fractured in a conventional manner such as by hydraulic fracturing using sand as the propping agent in the aqueous fracturing fluid. After the formation is fractured the treating composition in the gelled oil carrier fluid is injected into the created fractures. When the cement component sets and hardens the formation fluids can be recovered therethrough.

We claim:

1. A method of preventing the closure of fissures in an underground fractured hydrocarbon bearing, soft, calcareous formation to permit the production of hydrocarbons from said formation, which comprises injecting a hydraulic fracturing fluid containing a propping agent down a bore hole communicating with said formation at a pressure sufficient to form fissures therein, injecting into said formed fissures a treating composition consisting essentially of cement, from 4 to 8 parts by weight of 20–40 mesh size sand, per part of cement from 0.5 to 0.8 part by weight of water per part of cement, from 0.5 to 1.5 parts by weight, per part of cement, of a petroleum oil containing an oil-gelling agent in an amount of 3–7 percent by weight of oil, said sand, cement and water components being suspended in said petroleum oil in an amount of from about 6 to 12 pounds, per gallon of said petroleum oil, maintaining pressure on said composition for a predetermined period to permit the formation of a fluid permeable cement barrier in said formed fissures, and thereafter producing hydrocarbons from said formation.

2. In a method as claimed in claim 1, wherein said petroleum oil carrier medium is selected from the group consisting of kerosene, diesel oil, a residual oil fraction of crude oil and refined oil.

3. In a method as claimed in claim 1 wherein the propping agent is sand.

* * * * *